US011328470B2

(12) United States Patent
Gerveshi et al.

(10) Patent No.: US 11,328,470 B2
(45) Date of Patent: May 10, 2022

(54) DISTRIBUTED MULTI-CONTEXT INTERACTIVE RENDERING

(71) Applicant: DreamWorks Animation LLC, Glendale, CA (US)

(72) Inventors: Alexander Gerveshi, Glendale, CA (US); Sean Looper, Altadena, CA (US)

(73) Assignee: DreamWorks Animation LLC, Glendale, CA (US)

( * ) Notice: Subject to any disclaimer, the term of this patent is extended or adjusted under 35 U.S.C. 154(b) by 35 days.

(21) Appl. No.: 16/888,535

(22) Filed: May 29, 2020

(65) Prior Publication Data

US 2021/0027516 A1    Jan. 28, 2021

Related U.S. Application Data

(60) Provisional application No. 62/878,654, filed on Jul. 25, 2019.

(51) Int. Cl.
*G06T 15/00*     (2011.01)
*G06T 15/20*     (2011.01)

(52) U.S. Cl.
CPC ......... *G06T 15/005* (2013.01); *G06T 15/205* (2013.01)

(58) Field of Classification Search
None
See application file for complete search history.

(56) References Cited

U.S. PATENT DOCUMENTS

| | | | |
|---|---|---|---|
| 2005/0066000 A1* | 3/2005 | Li | H04L 41/0803 709/204 |
| 2006/0274072 A1* | 12/2006 | Bhatia | G06F 11/3688 345/501 |
| 2019/0164335 A1* | 5/2019 | Sheffield | G06T 15/506 |

FOREIGN PATENT DOCUMENTS

EP        2779105 A2        9/2014

OTHER PUBLICATIONS

Zotos, et al., "Distributed Rendering for Interactive Multi-screen Visualization Environments Based on XNA Game Studio", 2014, Big Data Analytics in the Social and Ubiquitous context: 5th International Workshop on Modeling Social Media, MSM 2014, 5th International Workshop on Mining Ubiquitous and Social Environments, Muse 2014 and First International Workshop on Machine Le, XP47294097, 20 pages.

(Continued)

*Primary Examiner* — Michelle Chin
(74) *Attorney, Agent, or Firm* — Lee, Hong, Degerman, Kang & Waimey PC

(57) ABSTRACT

A method of controlling rendering of computer images includes: providing first instructions to be processed at first computers, for rendering a first computer image; providing second instructions to be processed at second computers, for rendering a second computer image; receiving a user request for a change; and in response to receiving the request: regenerating the first instructions; providing first delta information to be processed at the first computers, reflecting one or more differences between the provided first instructions and the regenerated first instructions; regenerating the second instructions based on the request; providing second delta information to be processed at the second computers, reflecting one or more differences between the provided second instructions and the regenerated second instructions; receiving first rendering results from the first computers (Continued)

corresponding to the first delta information; and receiving second rendering results from the second computers corresponding to the second delta information.

21 Claims, 9 Drawing Sheets

(56) References Cited

OTHER PUBLICATIONS

Alex Gerveshi, et al., "Distributed Multi-Context Interactive Rendering", Proceedings of SIGGRAPH 2019, Jul. 2019, Los Angeles, XP55735304, https://research.dreamworks.com/wp-content/uploads/2019/10/digipro_talk_multicontext_v3.pdf, 2 pages.
European Patent Office Application Serial No. 20187478.1, Search Report dated Oct. 14, 2020, 9 pages.

* cited by examiner

DISTRIBUTED MULTI-CONTEXT INTERACTIVE RENDERING

CROSS-REFERENCE TO RELATED APPLICATION(S)

Pursuant to 35 U.S.C. § 119(e), this application claims the benefit of U.S. Provisional Patent Application No. 62/878,654, filed Jul. 25, 2019, the contents of which are hereby incorporated by reference herein in its entirety.

BACKGROUND

A computer-generated animation is typically created by rendering a sequence of images, with each image depicting a computer-generated scene composed of one or more computer-generated assets (e.g., a character, a group of characters, an environment, an effect, or a lighting rig). During an interactive session for rendering a scene, an artist may use one or more tools to change aspects or conditions of the scene. For example, a lighting artist may use a lighting tool to change conditions of the scene. According to the changes initiated by the artist, each of one or more rendering engines may render an image depicting the scene and send intermediate snapshots of the rendering results to a front-end client. These intermediate snapshots may be sent at particular time intervals. The front-end client controls a display of the snapshots, e.g., at a monitor. The artist may then evaluate progressive results of the changes that he or she had initiated, as the scene is rendered.

Rendering a computer graphics image at high resolution and complexity may be computationally expensive. For example, an artist may view such images at a front-end client (e.g., computer workstation). If computational work for rendering the images is performed only at the computer workstation being used by the artist, the speed of rendering is limited by the computational power of that workstation. To improve computational speed relating to rendering images, one or more back-end rendering engines (e.g., back-end farm computers) may be employed in the rendering process. In this situation, results of rendering an image are sent to the front-end client, e.g., over a communication interface. This may accelerate the presentation of rendered images at the front-end client, so that the artist is able to view, more quickly, results of changes he or she had initiated.

SUMMARY

With respect to various embodiments disclosed herein, features are described for improving performance with respect to interactive features for facilitating multi-context rendering. Alternatively (or in addition), features are described for improving a user interface at a front-end client configured to interact with multiple rendering sessions.

Aspects of the present disclosure are directed to a system for multi-machine rendering. For example, a user (e.g., a lighting artist) working on a shot may initiate a particular change (e.g., a change to a sequence-level lighting rig). The system may be configured to facilitate handling one or more events in such a situation. For example, the user may wish to see how the change affects other shots in the sequence. As another example, for longer shots, the user may wish to see how one or more changes that are made for one frame impact other frames. As yet another example, the user may wish to view variations of a same scene by, for example, trying different lighting setups, shading networks, and/or model variants.

Although features of embodiments of the present invention may be described, for purposes of illustration, within the context of an interactive lighting session in a computer animation environment, it is understood that described features are by no means limited to this context and may be applied in other contexts within the computer arts.

According to at least one embodiment, a method of controlling rendering of a plurality of computer images includes: providing a plurality of first instructions to be processed at a plurality of first computers, wherein the plurality of first instructions are for rendering a first computer image of the plurality of computer images; providing a plurality of second instructions to be processed at a plurality of second computers, wherein the plurality of second instructions are for rendering a second computer image of the plurality of computer images; receiving a user request for a change; and in response to receiving the user request: regenerating the plurality of first instructions based on the user request; providing first delta information to be processed at the plurality of first computers, the first delta information reflecting one or more differences between the provided plurality of first instructions and the regenerated plurality of first instructions; regenerating the plurality of second instructions based on the user request; providing second delta information to be processed at the plurality of second computers, the second delta information reflecting one or more differences between the provided plurality of second instructions and the regenerated plurality of second instructions; receiving first rendering results from the plurality of first computers, the first rendering results corresponding to the first delta information; and receiving second rendering results from the plurality of second computers, the second rendering results corresponding to the second delta information.

According to at least one embodiment, a machine-readable non-transitory medium stores thereon machine-executable instructions for controlling rendering of a plurality of computer images, the instructions including: providing a plurality of first instructions to be processed at a plurality of first computers, wherein the plurality of first instructions are for rendering a first computer image of the plurality of computer images; providing a plurality of second instructions to be processed at a plurality of second computers, wherein the plurality of second instructions are for rendering a second computer image of the plurality of computer images; receiving a user request for a change; and in response to receiving the user request: regenerating the plurality of first instructions based on the user request; providing first delta information to be processed at the plurality of first computers, the first delta information reflecting one or more differences between the provided plurality of first instructions and the regenerated plurality of first instructions; regenerating the plurality of second instructions based on the user request; providing second delta information to be processed at the plurality of second computers, the second delta information reflecting one or more differences between the provided plurality of second instructions and the regenerated plurality of second instructions; receiving first rendering results from the plurality of first computers, the first rendering results corresponding to the first delta information; and receiving second rendering results from the plurality of second computers, the second rendering results corresponding to the second delta information.

According to at least one embodiment, a system for controlling rendering of a plurality of computer images is disclosed. The system includes one or more controllers configured to: provide a plurality of first instructions to be processed at a plurality of first computers, wherein the plurality of first instructions are for rendering a first computer image of the plurality of computer images; provide a plurality of second instructions to be processed at a plurality of second computers, wherein the plurality of second instructions are for rendering a second computer image of the plurality of computer images; receive a user request for a change; and in response to receiving the user request: regenerate the plurality of first instructions based on the user request; provide first delta information to be processed at the plurality of first computers, the first delta information reflecting one or more differences between the provided plurality of first instructions and the regenerated plurality of first instructions; regenerate the plurality of second instructions based on the user request; provide second delta information to be processed at the plurality of second computers, the second delta information reflecting one or more differences between the provided plurality of second instructions and the regenerated plurality of second instructions; receive first rendering results from the plurality of first computers, the first rendering results corresponding to the first delta information; and receive second rendering results from the plurality of second computers, the second rendering results corresponding to the second delta information.

BRIEF DESCRIPTION OF THE DRAWINGS

The above and other aspects and features of the present disclosure will become more apparent upon consideration of the following description of embodiments, taken in conjunction with the accompanying figures.

DETAILED DESCRIPTION

In the following detailed description, reference is made to the accompanying figures which form a part hereof, and which show by way of illustration specific embodiments of the present invention. It is to be understood by those of ordinary skill in the technological field of computer animation and other computer modeling applications that other embodiments may be utilized, and that structural, electrical, as well as procedural changes may be made without departing from the scope of the present invention. Wherever possible, the same reference numbers will be used throughout the drawings to refer to the same or similar parts.

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown but is to be accorded the scope consistent with the claims.

For descriptive purposes, throughout this disclosure, software, software modules, software objects, and the like may be described as performing various functions. One of ordinary skill in the art, however, will recognize that software may not actively perform any function and instead may include instructions that are executable on a computer processor. As such, although software may be described herein as performing a function, it should be appreciated that a computer processor or other computing device may typically perform those functions attributed herein to software modules or objects by executing computer instructions provided by the software modules or objects.

Figure 1:
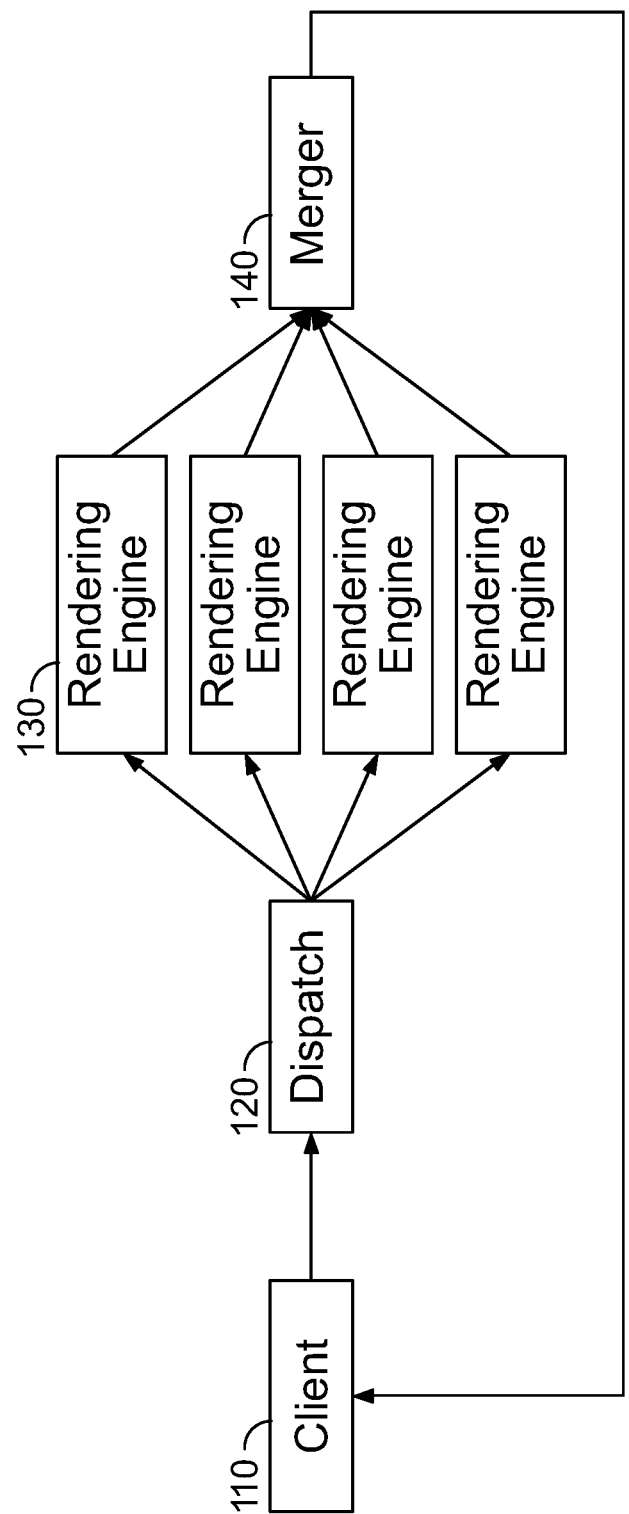
FIG. 1 is a block diagram illustrating operation by a plurality of rendering processes according to least one embodiment.

With reference to FIG. 1, during an interactive rendering session, a client (e.g., front-end client 110) provides inputs (e.g., input scene description, or scene update information) to a dispatch 120. The inputs may include, e.g., changes initiated by an artist. For example, the changes may be provided during the session, which may be an interactive lighting session. An example of such a change may involve increasing the intensity of a light. In other types of interactive rendering sessions, examples of a change may include moving a camera, changing a material property of a scene, and/or replacing geometry. One or more changes initiated at or around a particular time may correspond to a unique value of an identifier (e.g., syncId).

For a particular syncId, the dispatch 120 provides the inputs to each of a plurality of rendering engines 130. The rendering engines 130 may begin rendering when a scene is updated by the artist, and the underlying changes are provided to the rendering engines via the dispatch 120. Theoretically, different rendering engines 130 would provide rendering results of the exact same scene based on data corresponding to a same syncId.

The rendering engines 130 may reside on one or more hosts that are separate from the front-end client 110. For example, the rendering engines 130 may all reside on different hosts (e.g., different remote computers). The inputs are collectively processed by the rendering engines 130. According to at least one embodiment, the rendering engines 130 are independent entities that may be employed to collectively render a single (or same) image.

Each of the rendering engines 130 generates results. For example, different rendering engines 130 may provide results for different pixels. As another example, according to at least one embodiment, different rendering engines 130 may, at or around a particular time, provide results for a same pixel. At a given time, results generated by the rendering engines 130 are processed (or merged, e.g., by a merger 140) to produce a processed (e.g., merged) result. For example, at a particular interval (e.g., an artist-selected interval), each rendering engine 130 provides its results to the merger 140. For example, each rendering engine 130 may provide results at a frequency of 24 times per second. However, it is understood that this frequency may vary.

The merger 140 combines the results from the rendering engines 130 into a single image for display. The merged result is provided to the front-end client 110 (or saved in storage for later viewing). For example, the merger 140 may provide the merged result at a frequency of 24 times per second. However, it is understood that this frequency may vary. The front-end client 110 may control a display, e.g., an external monitor, to display snapshots of the merged result. As such, the artist may evaluate progressive results of the changes that he or she had initiated. From the perspective of the artist, progressive results may appear to be displayed in near real-time.

Employing one or more back-end farm computers (e.g., back-end rendering engines 130) may improve computational speed for rendering images. This may accelerate the delivery of rendered images to a front-end client (e.g., front-end client 110), so that the artist is able to view, earlier in time, results of changes to inputs to the renderer, e.g., as input to the dispatch 120.

As such, a number of key frames may be sent to such a render farm (including, e.g., one or more rendering engines 130), to enable the artist to view results at some later time. If the time required to produce results meeting an acceptable noise level is sufficiently short, then frames may be rendered locally in succession. Also, in at least one or more embodiments, the artist may concurrently initiate a change to both a frame and a shot during an interactive rendering session. In this situation, the artist may view (e.g., by flipping back-and-forth between) results of the change to both the frame and the shot.

Figure 2:
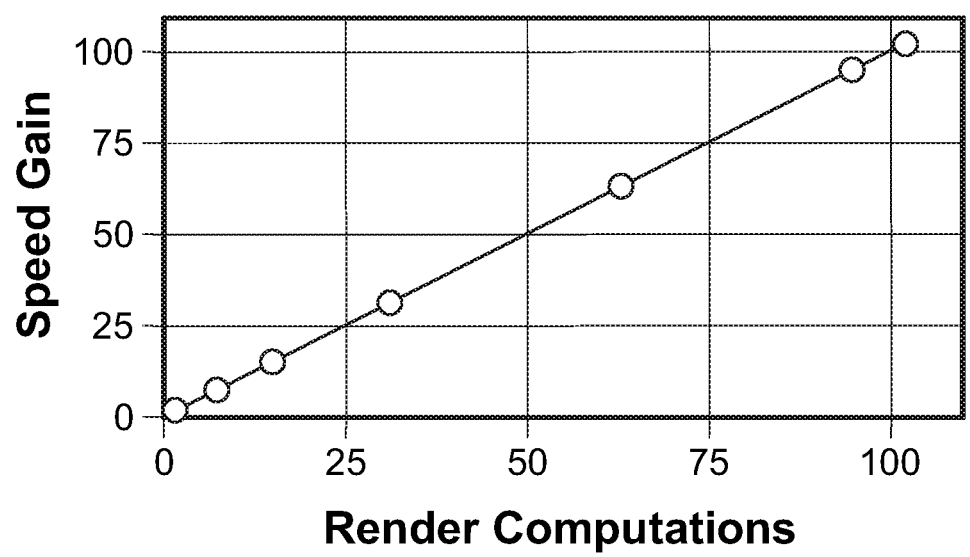
FIG. 2 is a graph illustrating an example improvement in computational speed for rendering images due to employing one or more render computations.

FIG. 2 is a graph illustrating an example improvement in computational speed for rendering images due to employing one or more render computations (e.g., back-end farm computers such as rendering engines 130). As illustrated in FIG. 2, as a number of employed rendering engines increases, a gain in computational speed also increases such that a time required for a renderer to converge decreases linearly (or approximately so). For example, a same test scene and a same set of render settings were utilized to create and analyze one scenario. The convergence time that was required when only a single render computation (e.g., a single rendering engine 130 having 32 hyper-threaded cores) was employed was 1 hour and 18 minutes. In contrast, the convergence time that was required when a total of 102 render computations (e.g., a total of 102 rendering engines 130 having a total of 102×32 (or 3,264) hyper-threaded cores) were employed was 45 seconds.

Techniques and/or features described herein with reference to various embodiments enable an artist to view a greater sampling of scenes (or "contexts") as he or she initiates changes during the course of an interactive rendering session. Such changes may include even sweeping artistic changes. This may not only improve artist efficiency, but also allow for increased artistic quality, as the artist becomes better informed of the results of his or her artistic choices. Otherwise, at any given moment, the artist may be able to view a full-fidelity render of only a single frame, even though he or she is able to initiate changes to scene data that potentially affect multiple frames (or multiple shots or multiple sequences) within a project.

Potential difficulties may be associated with limitations of the machine or workstation that is used by the artist. The machine or workstation may be similar to a device such as the front-end client 110 of FIG. 1. If scenes are rendered locally (e.g., at or within the front-end client), the rendering of each scene may be competing for a relatively limited set of memory and CPU (central processing unit) resources. The memory requirements of each scene may dictate how many scenes can be loaded at a given time. When a particular scene is complex, the number of scenes that can be loaded at a given time may be as few as only one or two. These scenes also compete for CPU resources, thereby causing render times to increase as the number of scenes increases. According to various embodiments disclosed herein, for environments such as those involving multi-scene workflows, more computationally-expensive work (e.g., more computationally-expensive tasks) may be moved off of a local machine (e.g., front-end client 110).

Potential difficulties may also arise in providing an artist with an application in which data and processing models are capable of characterizing and applying user modifications to multiple scenes in real-time (or in near real-time). Such an application may be required to perform such tasks without exceeding constraints of the workstation (e.g., front-end client 110) used by the artist. According to various embodiments disclosed herein, an application used by the artist provides tooling that allows targeting of specific scenes based on artist- or pipeline-specified criteria.

With respect to various embodiments disclosed herein, techniques and features are described for improving performance with respect to multi-scene (or multi-context) rendering and/or improving a user interface at a front-end client configured to interact with multiple rendering sessions.

For purposes of illustration, a cloud-based computation system will be described with reference to various embodiments. However, it is understood that other forms of computing may be utilized. According to various embodiments, a render computation (e.g., rendering engine) receives one or more messages, performs work based on contents of the messages, and then sends (or outputs) one or more outgoing messages. The system may be extensible and may allow users (e.g., artists) to create their own computations and message types.

A group of render computations may be referred to as a session. For example, FIG. 1 illustrates an example of a session including four render computations (e.g., four rendering engines 130). In the context of rendering, an example of a relatively simple session includes a single computation (e.g., a single rendering engine 130) that receives one or more message(s) from a client (e.g., front-end client 110), where the message includes scene description data. In response, the computation returns (or outputs) one or more rendered frames. To improve (or shorten) render convergence time, a session may include multiple render computations (e.g., multiple rendering engines 130), as illustrated in FIG. 1. Each of the computations may run (or operate) on a separate machine. For example, each of such machines may host a back-end rendering engine such as rendering engine 130.

Further regarding the session illustrated in FIG. 1, a "dispatch" computation (e.g., dispatch 120) receives the scene description message from the client and forwards the message to each of the render computations. A "merge" computation (e.g., merger 140) receives pixel results from each of the render computations and processes (e.g., combines or merges) the pixel results. The pixel results may be processed to produce, for example, a frame message that is to be sent to the client (e.g., front-end client 110). According to at least one embodiment, multiple render computations are utilized in a manner such that each render computation is configured to perform work (e.g., pixel computations) on a unique portion of the overall render (e.g., a unique portion of an overall image).

According to at least one embodiment, the render computations are configured to operate (or interact) with computing/processing systems, as described herein with reference to various embodiments. For example, in a session that includes multiple render computations (see, e.g., FIG. 1), an instance of each computation may use a different random seed for generating rays. Relative to an approach in which each computation is responsible for different sections (or portions) of the frame (or overall image), the use of such different random seeds may provide additional (or alternative) features. For example, machines of varying processing capabilities can be used to contribute to the overall render without producing a phenomenon in which visual artifacts appear in the merged image by virtue of faster machines producing converging results on corresponding section(s) of the frame more quickly than slower machines. The use of such random seeds may also facilitate better handling of one or more machines being dropped from the session. For example, a failure of one or more machines to operate may result in a longer convergence time, but not necessarily in failure (or non-completion) of the overall render.

When each render computation is performing work on the entire frame and sending data to the "merge" computation more frequently (e.g., multiple times per second), network bandwidth limits may become a concern as the number of render computations increases. To address this concern, the render computations may, for example, losslessly encode a delta (or difference(s)) between a previous "snapshot" and a current "snapshot" into the message that is sent to the "merge" computation. As such, the message need only contain data for the pixels that have changed relative to the previous snapshot, rather than a copy of the entire render buffer.

Katana® is an application used in performing lighting and rendering. Although features of various embodiments will be described, for purposes of illustration, with reference to capabilities that are associated with Katana, it is understood that such embodiments are compatible with applications other than Katana. When a render is started from a node graph (or node-based interface) using Katana, scene processing instructions generated by each node are collected to form an operation tree (or optree). For a given node, the corresponding optree includes a sequence of Katana operations that are performed to build the scene graph, as well as the initial arguments for each operation. Examples of such operations include, without limitation, the loading of scene data (e.g., Universal Scene Description (USD), Alembic), the creation/editing of materials and lights, the modification of an object's position, the setting of attributes to define the renderer's behavior, etc. The optree is then loaded into a Katana scene graph processing engine (e.g., Geolib3). To build the scene graph, Geolib3 executes the operations described (or listed) in the optree at each scene graph location. As such, all loading of data is deferred: no scene data is loaded until the scene graph is expanded by the processing engine.

In a multi-context environment (e.g., an environment involving multiple variations of a particular scene), an optree for each context can be constructed in a single Katana session without necessarily loading the scene data (such as a USD stage) for each context. According to one or more embodiments, a render computation (such as rendering engine 130) handles more expensive work (e.g., more computationally expensive tasks), including receiving the serialized optree as a computation system message, fully expanding the scene graph using Geolib3, building the renderer scene, and starting an interactive render.

Figure 3:
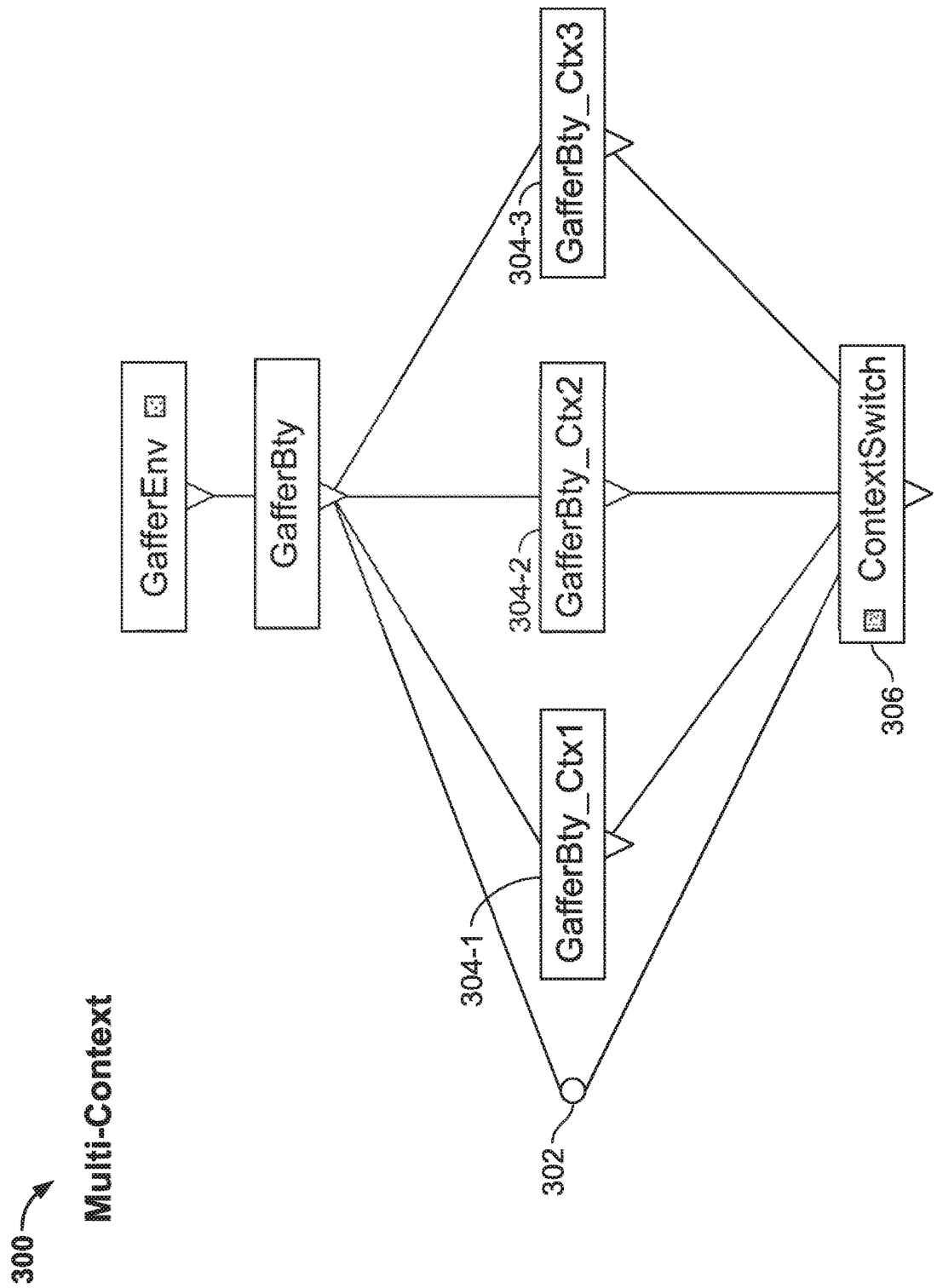
FIG. 3 illustrates an example of a node graph according to at least one embodiment.

FIG. 3 illustrates an example of a node graph 300 using Katana according to at least one embodiment. As illustrated, the node graph 300 includes a "ContextSwitch" node 306. The node 306 allows a user (e.g., an artist) to define multiple contexts, where each input to the node 306 may form the basis for a new context. As such, the user has flexibility to use separate node graphs for feeding into respective contexts, or to use a single node graph that branches off (from a single node) to allow for context-specific variations. For example, FIG. 3 illustrates that the node graph 300 includes multiples branches, each branch originating from the node 306. When the user starts a render from a node such as the node 306, the initial optrees are generated, and a session is started for each context. For example, FIG. 3 illustrates that contexts 302, 304-1, 304-2 and 304-3 are generated from the node 306. By way of example, the context 302 may correspond to an original scene (e.g., a scene having no further changes or variations introduced at the node 306). In contrast, the other three contexts 304-1, 304-2 and 304-3 may correspond to variations of the original scene corresponding to the context 302. For example, each of the contexts 304-1, 304-2 and 304-3 may include a respective lighting override relative to the lighting of the original scene.

In the example of FIG. 3, rendering from the ContextSwitch node 306 causes four sessions to be started. According to at least one embodiment, each session corresponds to a respective collection of connected render computations. For example, in a multi-context environment, multiple sessions are active, and each session may involve execution or performance of a respective set of one or more render computations. For each session, the resulting rendered frame data may then be presented for display at a respective area of a display screen. The presentation for display may be based on a user-defined layout.

Figure 4:
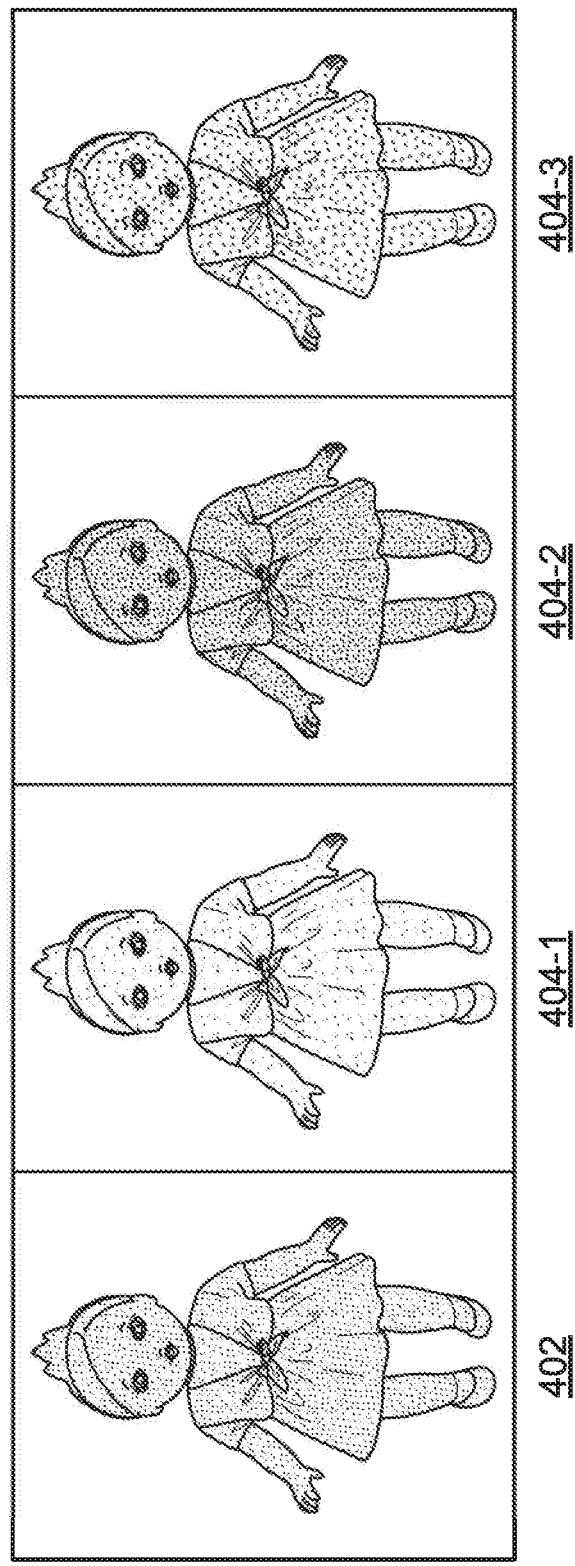
FIGS. 4 and 5 illustrate examples of rendered frame data results presented for display at respective areas of a display screen.

For example, FIG. 4 illustrates an example display of resulting rendered frame data corresponding to the contexts illustrated in the example of FIG. 3. With reference to both FIGS. 3 and 4, rendered frame data corresponding to the context 302 is displayed at area 402 (e.g., of a display screen). Similarly, rendered frame data corresponding to the context 304-1, rendered frame data corresponding to the context 304-2 and rendered frame data corresponding to the context 304-3 are displayed, respectively, at areas 404-1, 404-2 and 404-3 (e.g., of a display screen).

Figure 5:
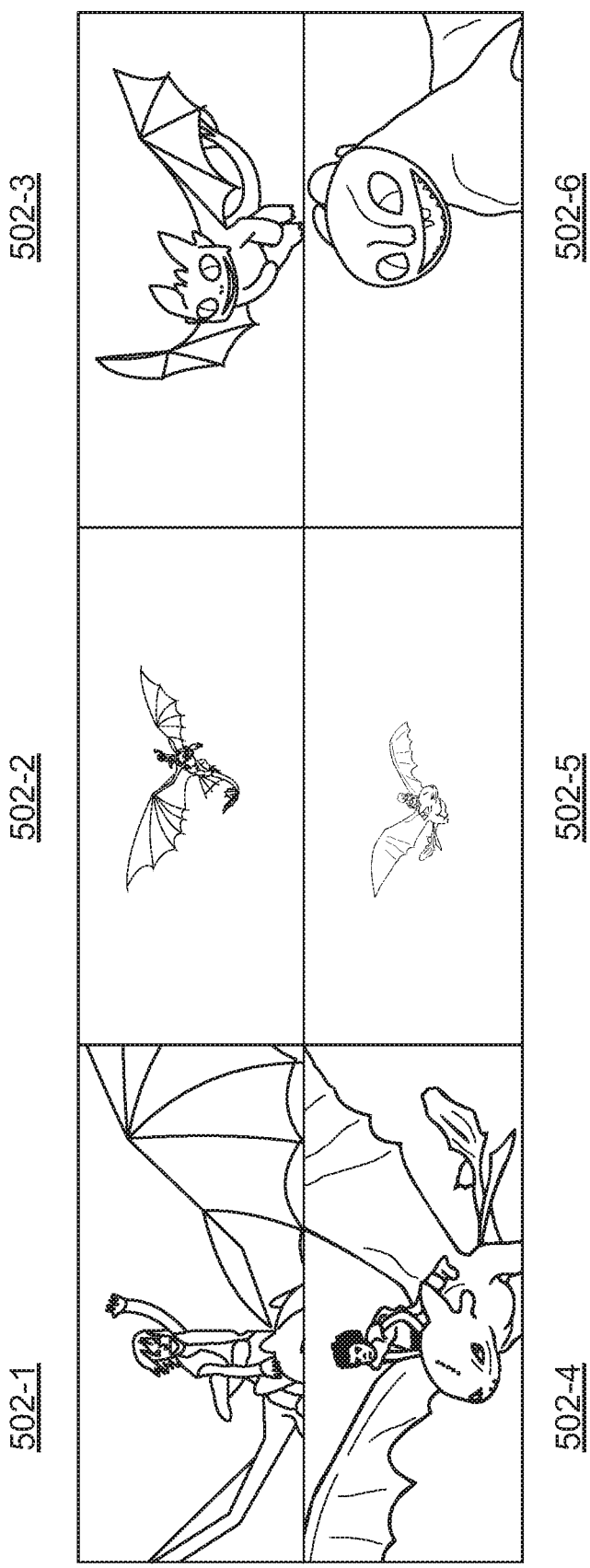

FIG. 5 illustrates another example display of resulting rendered frame data corresponding to different contexts. As illustrated in FIG. 5, rendered frame data corresponding to different contexts is displayed, respectively, at areas 502-1, 502-2, 502-3, 502-4, 502-5 and 502-6 (e.g., of a display screen). The different contexts may correspond to different frames from a shot or to different points in time within a shot.

The interactive render mechanism typically provided with Katana requires the artist to select the scene graph locations that he/she would like to monitor for updates. When the artist makes a change to the node graph, the corresponding optree is updated and the selected locations are re-evaluated by a single Geolib3 instance. Updated location data is then provided to the renderer.

The mechanism described in the previous paragraph may have several drawbacks. First, it is capable of handling only a single context, and not two or more contexts (see, e.g., FIGS. 3, 4 and 5). In addition, the mechanism requires the data for each scene to be loaded on the local machine. Due to constraints of the local machine, the mechanism may therefore be unsuitable for multi-context interactive rendering. In addition, monitoring, on a single machine, multiple scenes for updates may be computationally prohibitive.

According to at least one embodiment, the optree for each of multiple contexts is regenerated when an artist makes a change in a node graph. This may be a lightweight operation (e.g., a relatively light operation computation-wise) because Katana (or a similar application) caches the operations associated with each node. The latest (or most recent) optree for each context is compared with (or against) the previous (or immediately prior) optree. Here, the latest optree may be the regenerated optree produced in response to the change made by the artist. The previous optree may be the optree that was most recently provided to the corresponding session (e.g., before the change to the node graph was received). The difference between the two optrees is calculated and provided as an optree delta. The optree delta is sent to the corresponding session. There, the entire scene graph is monitored for changes, and the render is updated. This allows for each context to have different scene graph layouts without relying on the user to specify which scene graph locations he/she is interested in monitoring. This is because all scene graph locations may be monitored for all contexts.

Figure 6:
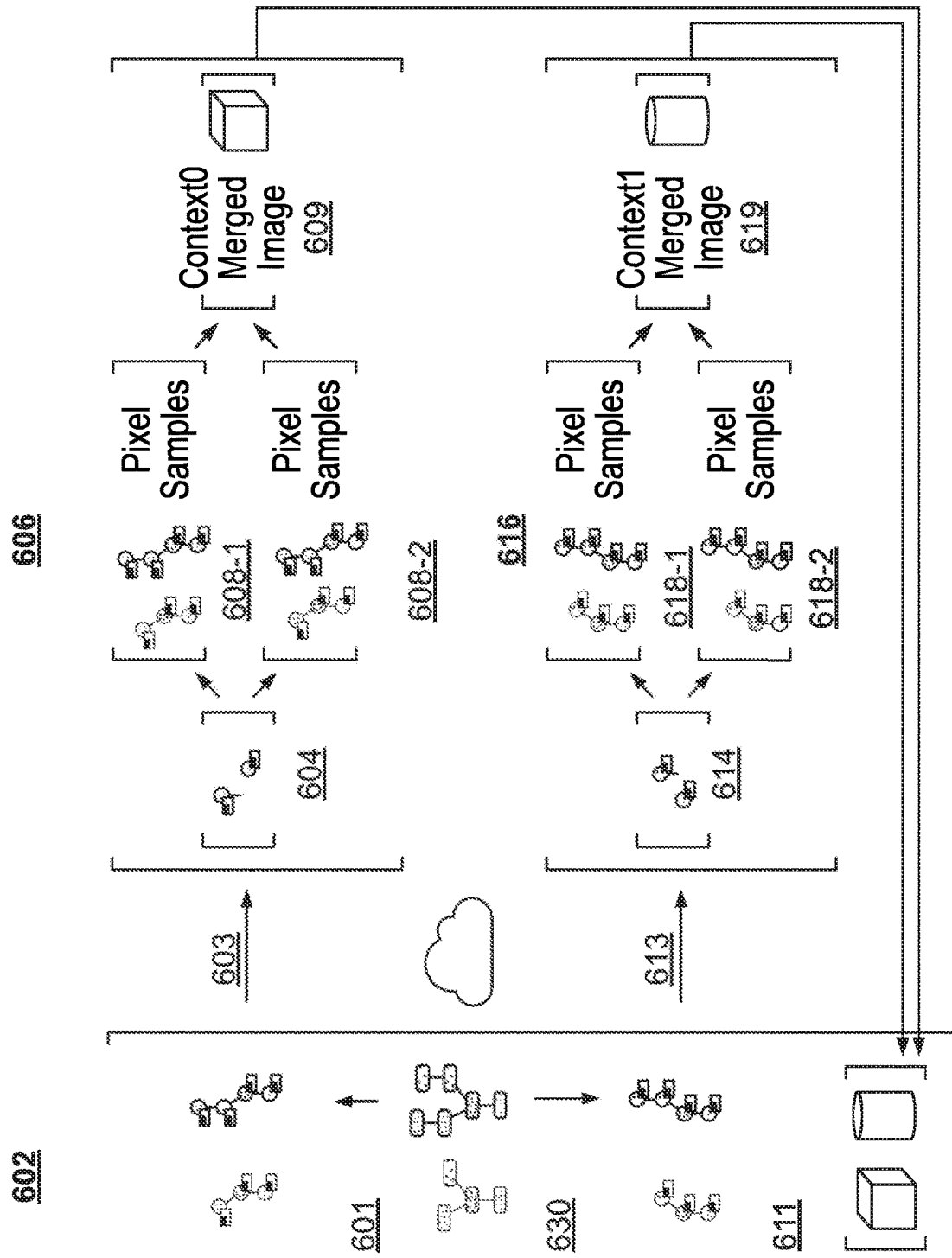
FIG. 6 illustrates an example generation of optree deltas in the context of distributed multi-context interactive rendering according to at least one embodiment.

FIG. 6 illustrates an example generation of optree deltas in the context of distributed multi-context interactive rendering according to at least one embodiment. By way of example, FIG. 6 illustrates two sessions 606 and 616. However, it is understood that features described may apply to more than two sessions. Each of the sessions 606, 616 has two rendering engines (or render computations). For example, the session 606 includes rendering engines 608-1 and 608-2. Similarly, the session 616 includes rendering engines 618-1 and 618-2. For purposes of simplicity, the sessions 606, 616 are illustrated as each including two rendering engines. However, it is understood each of the sessions 606, 616 may include more than two rendering engines (e.g., up to 100 or more rendering engines).

Each session 606, 616 may be similar to corresponding entities/structures described earlier with reference to FIG. 1. For example, similar to the manner in which the dispatch 120 receives scene description message(s) from the front-end client 110 and forwards the message to each of the rendering engines 130 (see FIG. 1), the dispatch 604 may receive, for a particular context, scene description message(s) from the client 602 and may forward the message to the rendering engines 608-1 and 608-2. Similarly, the dispatch 614 may receive, for another particular context, scene description message(s) from the client 602 and may forward the message to the rendering engines 618-1 and 618-2.

In addition, similar to the manner in which the merger 140 receives pixel results from each of the rendering engines 130 and processes (e.g., combines or merges) the pixel results (see FIG. 1), a merger 609 may receive pixel results from each of the rendering engines 608-1 and 608-2. The pixel results may be processed to produce, for example, a frame message that is to be sent to the client 602. Similarly, a merger 619 may receive pixel results from each of the rendering engines 618-1 and 618-2. The pixel results may be processed to produce, for example, a frame message that is to be sent to the client 602.

Frame messages that are sent to the client 602 may be used to produce a composite image 620. The composite image 620 may be similar to the examples illustrated in FIGS. 4 and 5. With reference back to FIG. 4, the frame message produced by the merger 609 may correspond, for example, to the rendered frame data displayed at area 402, and the frame message produced by the merger 619 may correspond, for example, to the rendered frame data displayed at area 404-1.

According to at least one embodiment, when an artist makes a change in a node graph 630, optrees 601, 611 for the sessions 606, 616 are regenerated. As described earlier, each optree includes a sequence of operations (e.g., Katana operations) that are to be performed to build the scene graph, as well as the initial arguments for each operation. For example, the optree 601 may include a sequence of operations that are to be performed, e.g., by the rendering engines 608-1 and 608-2, to build the scene graph for which results are to be merged by merger 609. Similarly, the optree 611 may include a sequence of operations that are to be performed, e.g., by the rendering engines 618-1 and 618-2, to build the scene graph for which results are to be merged by merger 609.

For each context, an optree delta is calculated and sent to the corresponding dispatch computation.

According to at least one embodiment, the optree delta is calculated at the client (e.g., client 602). An example of a relatively simple optree delta will now be described with reference to an artist-initiated change in a position of a light. In this situation, the corresponding optree delta may include an ID of an operation that controls the setting of this position. The optree delta may also include, e.g., as a parameter, a new position (e.g., transform matrix) of the light. According to at least one embodiment, for purposes of reducing complexity, the contents of the optree delta are limited to such information in such a situation.

With continued reference to FIG. 6, for example, for the session 606, the regenerated optree 601 is compared with the previous (or immediately prior) optree. The previous optree may be the optree that has been most recently generated and sent to the dispatch 604. The difference between the two optrees (i.e., optree 601 and the previous optree) is calculated, and provided as an optree delta 603. The optree delta 603 is provided to the dispatch 604.

As another example, for the session 616, the regenerated optree 611 is compared with the previous (or immediately prior) optree. The previous optree may be the optree that has been most recently generated and sent to the dispatch 614. The difference between the two optrees (i.e., optree 611 and the previous optree) is calculated, and provided as an optree delta 613. The optree delta 613 is provided to the dispatch 614.

The optree delta is provided to the corresponding rendering engines and is used to synchronize its local optree to match the optree effectively input by the user. The scene graph is re-evaluated and the state of the renderer is updated. The renderer starts producing new pixel samples, which are sent to the corresponding merge computation. There, the pixel samples are merged and are sent to the client, such that the results can be displayed (e.g., on a screen or monitor). In this regard, the term "pixel sample" may refer to data returned by casting (or tracing) a ray into a scene (according, e.g., to a Monte Carlo path tracing rendering method or algorithm). As more and more rays are cast, the number of samples per pixel increases and the quality of the rendered image is improved.

For example, the optree delta 603 is provided by the dispatch 604 to the rendering engines 608-1 and 608-2 and is used to synchronize its local optree to match the optree effectively input by the user. The scene graph is re-evaluated and the state of the renderer is updated. The renderer starts producing new pixel samples, which are sent to the merger

609. There, the pixel samples are merged and are sent to the client 602, such that the results can be displayed (e.g., on a screen or monitor).

As another example, the optree delta 613 is provided by the dispatch 614 to the rendering engines 618-1 and 618-2 and is used to synchronize its local optree to match the optree effectively input by the user. The scene graph is re-evaluated and the state of the renderer is updated. The renderer starts producing new pixel samples, which are sent to the merger 619. There, the pixel samples are merged and are sent to the client 602, such that the results can be displayed (e.g., on a screen or monitor).

According to at least one embodiment, a local application (e.g., at the client 602) is responsible for generating optree deltas and receiving rendered frame data from the computation system. More computationally expensive tasks are offloaded to back-end rendering engines (e.g., rendering engines 130). As such, limitations with regards to processing power may be determined, for example, by the amount of cloud resources available to an artist, rather than by constraints associated with the local machine used by the artist. Accordingly, each context on which an artist is working can utilize resources (e.g., memory and CPU) of the cloud-based machines assigned to the corresponding session, rather than compete (e.g., against one or more other contexts) for resources on the local machine.

It is understood that features that have been described herein with reference to various embodiments can be applied using applications other than Katana. For example, it is understood that features described can be applied using any of various applications configured to construct an optree and connect to (or interface with) a computation system that is in use. According to various embodiments, such applications may be configured to facilitate multi-context rendering, as has been described herein.

Currently, the Geolib3 runtime is single-threaded. To increase performance by using multiple threads, the scene graph traversal may be distributed across multiple runtime instances without each runtime inadvertently cooking (or creating) the entire scene graph. This may be achieved through use of the Intel Threading Building Blocks (TBB) library. A TBB task may be developed to evaluate a scene graph location and then create a child task for each child of the scene graph location. The TBB work-stealing algorithm ensures that the cooking of scene graph locations is spread across the thread pool, with each worker thread having a thread-local Geolib3 runtime. Each worker thread is also responsible for monitoring the scene graph locations that it cooked during the initial traversal. When an optree delta is received, the optree delta may be applied to each thread-local runtime.

When each render computation in a session builds the rendering scene from the optree, the time-to-first-pixel will be the same as for local renders, unless the computations can also distribute the work of building the scene. Using TBB to multi-thread the scene build, scene graph locations may be traversed in a non-deterministic order. A shared cache may be created to allow more expensive operations (e.g., more computationally expensive operations) such as renderer procedural resolvers to write the resolved geometry data (e.g., to a form of memory such as disk). This allows for the scene build to be partially distributed between the computations. Additionally, the scene build time for subsequent renders containing the same assets is greatly reduced, as the operations can read the results back from memory (e.g., disk).

According to one or more embodiments, multi-context rendering may be used to facilitate interactive reviews with creative supervisors. When an artist is given notes (or comments) regarding a sequence, the artist has typically been required to make the changes once the session was over, submit the updated shots to a processing location (e.g., a processing farm), and then continue the process at a future time. Using a multi-context environment according to one or more embodiments disclosed herein, the artist can make changes (e.g., in the lighting tool) and be able to review corresponding results in real-time (or near real-time), e.g., while the director is still in the room. It is understood that such changes are not limited to lighting. For example, changes with respect to animation, geometry, materials, or any other part of the scene can be made while maintaining interactive frame rates.

This scenario may be even more compelling when each session is using multiple render computations. For example, an artist driving a session may initiate a render having six contexts, where the session for each context requests four 48-core machines. Accordingly, from the perspective of the artist, it appears that he or she has initiated six 192-core interactive renders from a single application (e.g., Katana). By reducing the necessity of offline rendering, the decision to "final" a shot may, to a greater degree, be a purely creative decision, rather than a decision that is subject to time constraints associated with typical methods.

Figure 7:
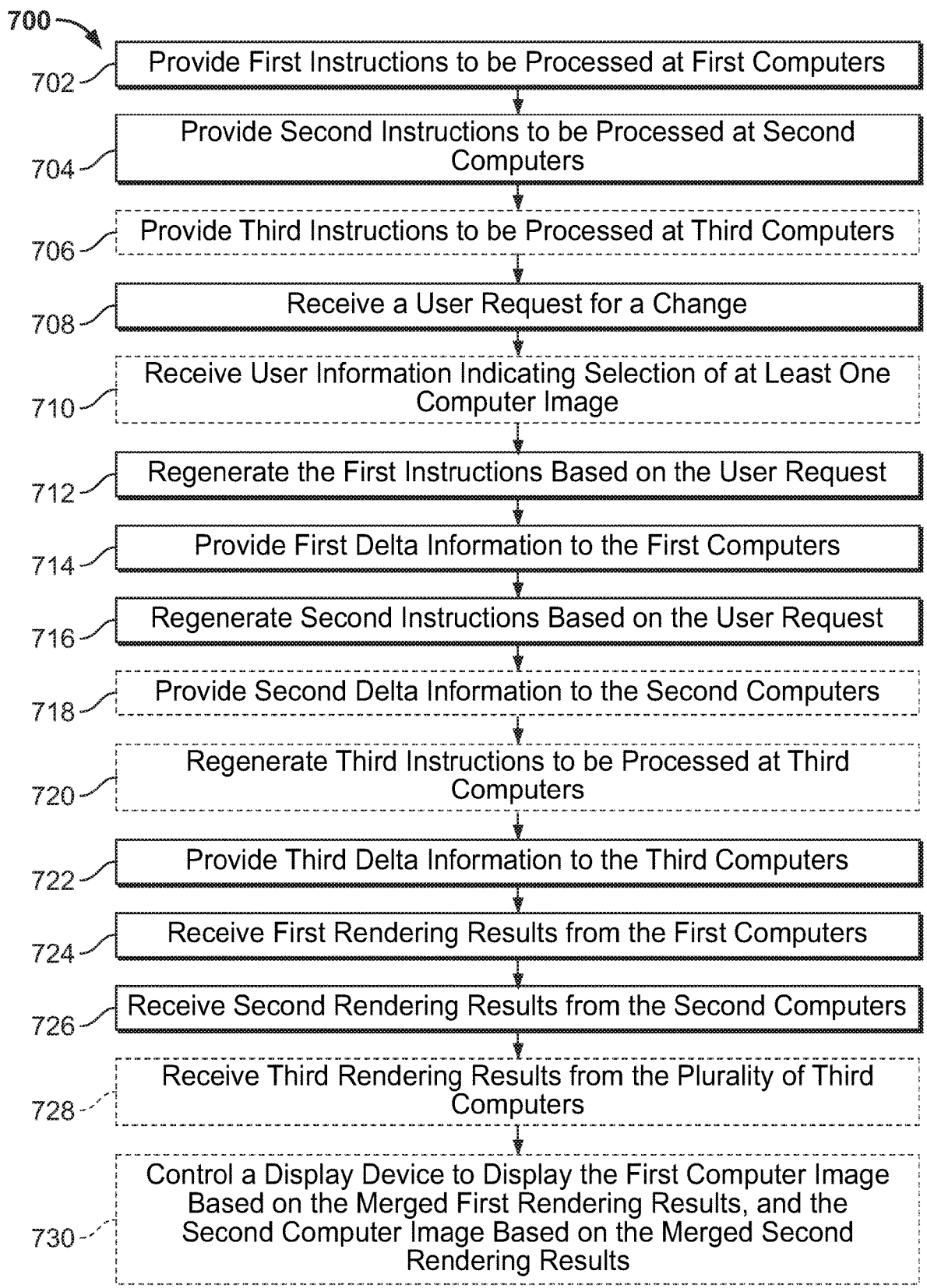
FIG. 7 illustrates a flowchart of a method of controlling rendering of computer images according to at least one embodiment.

FIG. 7 illustrates a flowchart of a method 700 of controlling rendering of a plurality of computer images according to at least one embodiment.

At block 702, a plurality of first instructions are provided to a plurality of first computers. The plurality of first instructions are to be processed at the plurality of first computers and are for rendering a first computer image of the plurality of computer images.

For example, with reference to FIG. 6, an optree is provided to the rendering engines 608-1, 608-2 via the dispatch 604. The optree includes instructions (or operations) that are to be processed at the rendering engines 608-1, 608-2, and are for rendering a first computer image (e.g., a respective portion of a composite image 620).

The plurality of first computers may include at least two remote computers. For example, the rendering engines 608-1, 608-2 may reside at respective remote computers (or remote hosts).

At block 704, a plurality of second instructions are provided to a plurality of second computers. The plurality of second instructions are to be processed at the plurality of second computers and are for rendering a second computer image of the plurality of computer images.

For example, with reference to FIG. 6, an optree is provided to the rendering engines 618-1, 618-2 via the dispatch 614. The optree includes instructions (or operations) that are to be processed at the rendering engines 618-1, 618-2, and are for rendering a second computer image (e.g., a respective portion of the composite image 620).

The plurality of second computers may include at least two remote computers. For example, the rendering engines 618-1, 618-2 may reside at respective remote computers (or remote hosts).

According to at least one further embodiment, the at least two remote computers of the plurality of first computers are distinct from the at least two remote computers of the plurality of second computers. For example, the remote computers at which the rendering engines 608-1, 608-2 respectively reside may be distinct from the remote computers at which the rendering engines 618-1, 618-2 respectively reside.

According to at least one further embodiment, the first computer image and the second computer image correspond to respective variations of a scene (see, e.g., FIG. 4).

According to at least one further embodiment, the first computer image and the second computer image correspond to respective shots of a sequence (see, e.g., FIG. 5).

According to at least one further embodiment, at block 706, a plurality of third instructions are provided to a plurality of third computers. The plurality of third instructions are to be processed at the plurality of third computers and are for rendering a third computer image of the plurality of computer images.

For example, with reference to FIG. 6, an optree is provided to another set of rendering engines (e.g., rendering engines similar to the rendering engines 618-1, 618-2) via a corresponding dispatch (e.g., a dispatch similar to dispatch 614). The optree includes instructions (or operations) that are to be processed at the rendering engines and are for rendering a third computer image (e.g., a respective portion of the composite image 620).

At block 708, a user request for a change is received.

For example, with reference to FIG. 6, an artist makes a change in the node graph 630, and a request for this change is received.

According to at least one further embodiment, at block 710, user information is received. The user information indicates selection of at least one of the plurality of computer images.

For example, with reference to FIG. 6, information is received, indicating that the artist selects the portion of the composite image 620 corresponding to the merger 609, the portion of the composite image 620 corresponding to the merger 619 and/or a portion of the composite image corresponding to an additional merger that is not explicitly illustrated in FIG. 6.

At block 712, in response to receiving the user request of block 708, the plurality of first instructions are regenerated based on the user request.

For example, with reference to FIG. 6, the optree for the session 606 is regenerated as optree 601 based on the change in the node graph 630.

At block 714, first delta information is provided to the plurality of first computers. The first delta information reflects one or more differences between the provided plurality of first instructions and the regenerated plurality of first instructions.

For example, for the session 606, the regenerated optree 601 is compared with the previous (or immediately prior) optree (e.g., the optree of block 702). The difference between the two optrees (e.g., the optree 601 and the optree of block 702) is calculated and provided as an optree delta 603. The optree delta 603 is provided to the rendering engines 608-1, 608-2 via the dispatch 604.

At block 716, in response to receiving the user request of block 708, the plurality of second instructions are regenerated based on the user request.

For example, with reference to FIG. 6, the optree for the session 616 is regenerated as optree 611 based on the change in the node graph 630.

At block 718, second delta information is provided to the plurality of second computers. The second delta information reflects one or more differences between the provided plurality of second instructions and the regenerated plurality of second instructions.

For example, for the session 616, the regenerated optree 611 is compared with the previous (or immediately prior) optree (e.g., the optree of block 704). The difference between the two optrees (e.g., the optree 611 and the optree of block 704) is calculated and provided as an optree delta 613. The optree delta 613 is provided to the rendering engines 618-1, 618-2 via the dispatch 614.

According to at least one further embodiment, the received user information indicates selection of both the first computer image and the second computer image. The regeneration of the plurality of first instructions, the providing of the first delta information, the regeneration of the plurality of second instructions, and the providing of the second delta information are performed in response to the selection of both the first computer image and the second computer image.

For example, the regenerating of block 712, the providing of block 714, the regenerating of block 716 and the providing of block 718 are performed in response to selection (e.g., at block 710) of both the portion of the composite image 620 corresponding to the merger 609 and the portion of the composite image 620 corresponding to the merger 619. If the selection indicates otherwise, the regenerating of block 712, the providing of block 714, the regenerating of block 716 and the providing of block 718 may not all be performed. For example, if the selection indicates selection of only the portion of the composite image 620 corresponding to the merger 609, then the regenerating of block 712 and the providing of block 714 may be performed. However, the regenerating of block 716 and the providing of block 718 may not be performed. Similarly, if the selection indicates selection of only the portion of the composite image 620 corresponding to the merger 619, then the regenerating of block 716 and the providing of block 718 may be performed. However, the regenerating of block 712 and the providing of block 714 may not be performed.

According to at least one further embodiment, at block 720, in response to receiving the user request of block 708, the plurality of third instructions are regenerated based on the user request.

For example, the optree of block 706 is regenerated based on the change in the node graph 630.

At block 722, third delta information is provided to the plurality of third computers. The third delta information reflects one or more differences between the provided plurality of third instructions and the regenerated plurality of third instructions.

For example, for the rendering engines described with reference to block 706, the regenerated optree of block 720 is compared with the previous (or immediately prior) optree (e.g., the optree of block 706). The difference between the two optrees (e.g., the regenerated optree of block 720 and the optree of block 706) is calculated and provided as an optree delta. The optree delta is provided to the rendering engines described with reference to block 706, via a corresponding dispatch.

According to at least one further embodiment, the received user information further indicates selection of the third computer image in addition to both the first computer image and the second computer image. In response to the received user information further indicating selection of the third computer image in addition to both the first computer image and the second computer image, the regenerating of the third instructions and the providing of the third delta information are performed.

For example, in response to the received user information (of block 710) further indicating selection of the portion of the composite image 620 described earlier with reference to block 706, in addition to both the portion of the composite image 620 corresponding to the merger 609 and the portion of the composite image corresponding to the merger 619, the regenerating of block 720 and the providing of block 722 are performed.

In contrast, in response to the received user information not further indicating selection of the third computer image, the regeneration of the plurality of third instructions and the providing of the third delta information may not be performed.

For example, in response to no selection (e.g., at block 710) of the portion of the composite image 620 described earlier with reference to block 706, the regenerating of block 720 and the regenerating of block 722 may not be performed.

At block 724, first rendering results are received from the plurality of first computers, the first rendering results corresponding to the first delta information.

For example, with reference to FIG. 6, new pixel samples are received from the rendering engines 608-1, 608-2. The new pixel samples correspond to the optree delta 603. According to at least one further embodiment, the new pixel samples are merged (e.g., by the merger 609).

At block 726, second rendering results are received from the plurality of second computers, the second rendering results corresponding to the second delta information.

For example, with reference to FIG. 6, new pixel samples are received from the rendering engines 618-1, 618-2. The new pixel samples correspond to the optree delta 613. According to at least one further embodiment, the new pixel samples are merged (e.g., by the merger 619).

According to at least one further embodiment, at block 728, third rendering results are received from the plurality of third computers, the third rendering results corresponding to the third delta information.

For example, with reference to FIG. 6, new pixel samples are received from the rendering engines described earlier with reference to block 706. The new pixel samples correspond to the optree of block 722. According to at least one further embodiment, the new pixel samples are merged (e.g., by a corresponding merger).

At block 730, a display device is controlled to display the first computer image based on the merged first rendering results, and the second computer image based on the merged second rendering results.

For example, with reference to FIG. 6, at the client 602, a display device is controlled to display portions of the composite image 620 based on the results received from the mergers 609 and 619.

Figure 8:
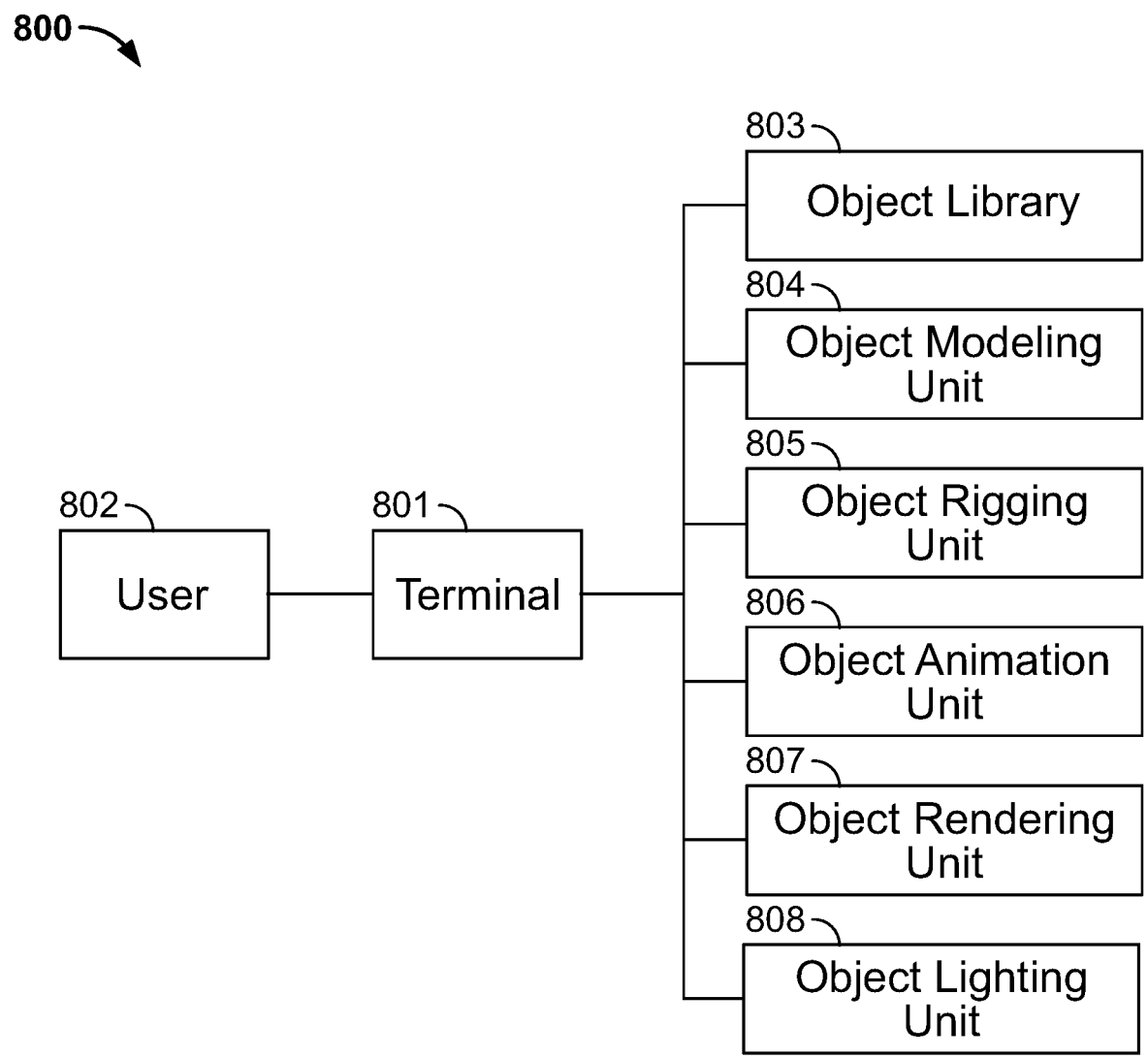
FIG. 8 is an illustration of a computing environment according to at least one embodiment.

Referring now to FIG. 8, a simplified block diagram of a system 800 for creating computer graphics imagery (CGI) and computer-aided animation is shown that may implement or incorporate various embodiments of the present disclosure. The system 800 may include one or more terminals 801. The one or more terminals 801 may include hardware and software elements configured for designing CGI and assisting with computer-aided animation. The terminals 801 may be implemented as a single computing device or a set of one or more computing devices, corresponding to computer hardware and/or software.

Examples of terminals 801 may be desktop computers, laptop computers, workstation computers, mainframes, cluster computing systems, cloud computing terminals, embedded computing devices, computer graphics devices, gaming devices and consoles, video media playback devices, consumer electronic devices having programmable processors, or the like. The one or more terminals 801 may be utilized at various stages of a production process, including pre-production, modeling, designing, creating, editing, simulating, animating, rendering, post-production, finishing, publishing, and the like, to produce recordings, computer files, tangible materials, and the like, related to or comprising images, image sequences, motion pictures, video, audio, or associated effects related to CGI and animation.

In an example of system 800, a user 802 may utilize the one or more terminals 801 to design, create, or modify objects within a computer-generated interface displayed on display associated with the terminal 801.

The terminal may implement, include, or otherwise be in operable communication with, systems and units including object library 803, object modeling unit 804, object rigging unit 805, object animation unit 806, object rendering unit 807, and object lighting unit 808. Object library 803 may include software and/or hardware elements configured for storing and accessing information related to objects to be accessed, requested, retrieved, and/or used by the one or more terminals 801 to design, create, and modify models (e.g., 3D models) of objects in the CGI and animation processes.

Object modeling unit 804 may include software and/or hardware elements and information to be accessed, requested, retrieved, and/or used by the one or more terminals 801 to sculpt and design the 3D model to take on the desired appearance as instructed by user 802, or other terminal operator during the CGI and animation process.

Object rigging unit 805 may include software and/or hardware elements and information to be accessed, requested, retrieved, and/or used by the one or more terminals 801 to design, create, or modify components of 3D models to define articulation points and movement ranges of various elements of the 3D model.

Object animation unit 806 may include software and/or hardware elements and information to be accessed, requested, retrieved, and/or used by the one or more terminals 801 to design, create, or modify animation aspects of a 3D model, including specifying the motion and position of various elements of the 3D model over time during the animation, such as specifying animation paths, cues, or the like or generating key frames or intermediary frames for animated motion of the 3D model.

Object rendering unit 807 may include software and/or hardware elements and information to be accessed, requested, retrieved, and/or used by the one or more terminals 801 to design, create, or modify a final appearance of the animated 3D model, including generating one or more images of one or more computer-generated objects, including textures, colors, rigging, controls, and the like.

Object lighting unit 808 may include software and/or hardware elements and information to be accessed, requested, retrieved, and/or used by the one or more terminals 801 to design, create, or modify lighting aspects of a 3D model and animated scenes, including defining lighting sources, shading, reflections, refractions, textures, colors, and the like.

The one or more terminals 801 may be in communication with one or more server computers which may operatively be in communication with one or more data stores (e.g., databases, indexes, files, or other data structures). The one or more server computers may connect to a data communication network comprising a local area network (LAN), a wide area network (WAN) (e.g., the Internet), a telephone network, a satellite or wireless communication network, or some combination of these or similar networks.

In selected embodiments, the one or more server computers may implement one or more processes, systems, or units of the animation system, including object library 803, object modeling unit 804, object rigging unit 805, object animation unit 806, object rendering unit 807, object lighting unit 808, and the like. The one or more terminals 801, the one or more server computers, or any other aspect of the system 800, may be associated or coupled with a display configured to display information, including a displayed interface for displaying, performing, executing, instructing, reviewing, and/or selecting operations of the present disclosure.

Figure 9:
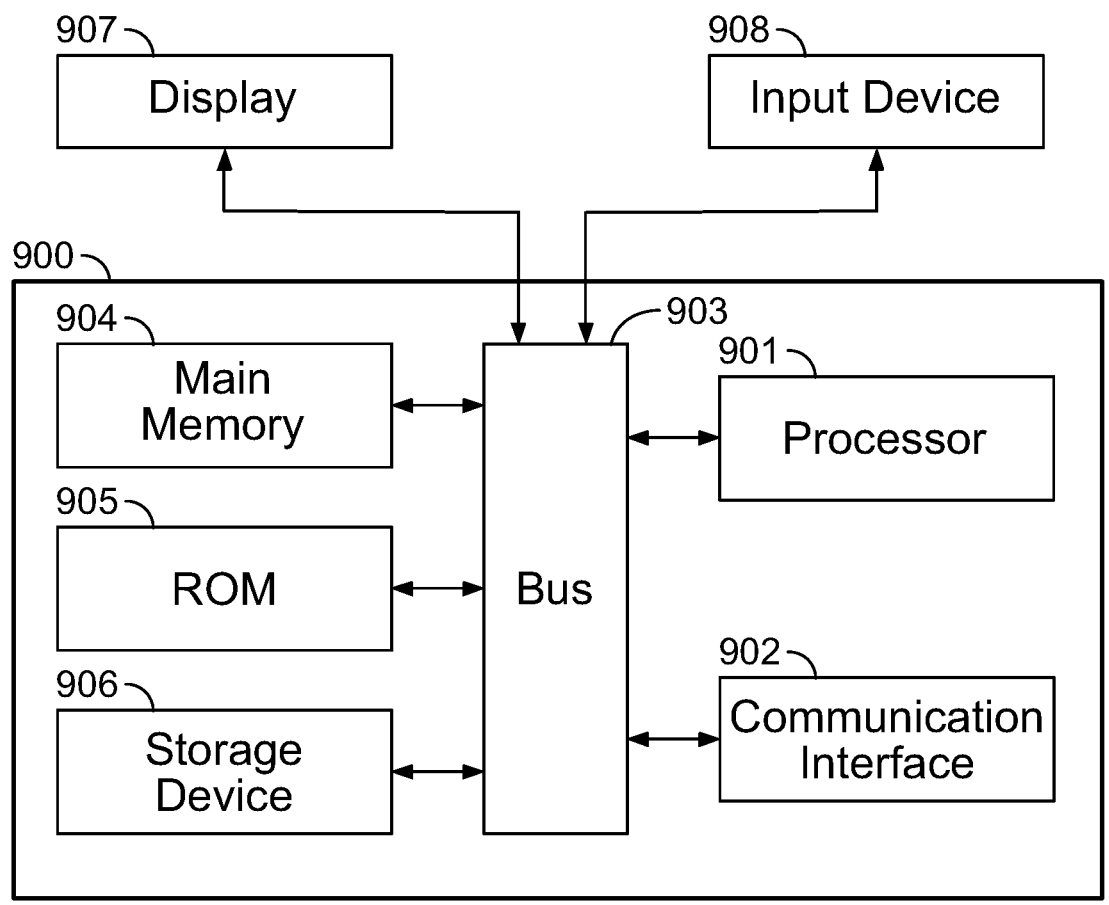
FIG. 9 is a block diagram of a device according to at least one embodiment.

Referring to FIG. 9, an illustration of an example computer 900 is provided. One or more of aspects of the system 800 discussed above in FIG. 8, such as the one or more terminals 801 or the one or more server computers, may be configured as or include such a computer 900. In selected embodiments, the computer 900 may include a bus 903 (or multiple buses) or other communication mechanism, a processor 901, main memory 904, read only memory (ROM) 905, one or more additional storage devices 906, and/or a communication interface 902, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 903 or other communication mechanism, including multiple such buses or mechanisms, may support communication of information within the computer 900. The processor 901 may be connected to the bus 903 and process information. In selected embodiments, the processor 901 may be a specialized or dedicated microprocessor configured to perform particular tasks in accordance with the features and aspects disclosed herein by executing machine-readable software code defining the particular tasks. Main memory 904 (e.g., random access memory—or RAM—or other dynamic storage device) may be connected to the bus 903 and store information and instructions to be executed by the processor 901. Main memory 904 may also store temporary variables or other intermediate information during execution of such instructions.

ROM 905 or some other static storage device may be connected to a bus 903 and store static information and instructions for the processor 901. An additional storage device 906 (e.g., a magnetic disk, optical disk, memory card, or the like) may be connected to the bus 903. The main memory 904, ROM 905, and the additional storage device 906 may include a non-transitory computer-readable medium holding information, instructions, or some combination thereof, for example instructions that when executed by the processor 901, cause the computer 900 to perform one or more operations of a method as described herein. A communication interface 902 may also be connected to the bus 903. A communication interface 902 may provide or support two-way data communication between a computer 900 and one or more external devices (e.g., other devices contained within the computing environment).

In selected embodiments, the computer 900 may be connected (e.g., via a bus) to a display 907. The display 907 may use any suitable mechanism to communicate information to a user of a computer 900. For example, the display 907 may include or utilize a liquid crystal display (LCD), light emitting diode (LED) display, projector, or other display device to present information to a user of the computer 900 in a visual display. One or more input devices 908 (e.g., an alphanumeric keyboard, mouse, microphone, stylus pen) may be connected to the bus 903 to communicate information and commands to the computer 900. In selected embodiments, one input device 908 may provide or support control over the positioning of a cursor to allow for selection and execution of various objects, files, programs, and the like provided by the computer 900 and displayed by the display 907.

The computer 900 may be used to transmit, receive, decode, display, or the like one or more video files. In selected embodiments, such transmitting, receiving, decoding, and displaying may be in response to the processor 901 executing one or more sequences of one or more instructions contained in main memory 904. Such instructions may be read into main memory 904 from another non-transitory computer-readable medium (e.g., a storage device).

Execution of sequences of instructions contained in main memory 904 may cause the processor 901 to perform one or more of the procedures or steps described herein. In selected embodiments, one or more processors in a multi-processing arrangement may also be employed to execute sequences of instructions contained in main memory 904. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 901, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 902 may provide or support external, two-way data communication to or via a network link. For example, a communication interface 902 may be a wireless network interface controller or a cellular radio providing a data communication network connection. Alternatively, a communication interface 902 may comprise a local area network (LAN) card providing a data communication connection to a compatible LAN. In any such embodiment, a communication interface 902 may send and receive electrical, electromagnetic, or optical signals conveying information.

A network link may provide data communication through one or more networks to other data devices (e.g., one or more terminals 801 as shown in the system 800). For example, a network link may provide a connection through a local network of a host computer or to data equipment operated by an Internet Service Provider (ISP). An ISP may, in turn, provide data communication services through the Internet. Accordingly, a computer 900 may send and receive commands, data, or combinations thereof, including program code, through one or more networks, a network link, and communication interface 902. Thus, the computer 900 may interface or otherwise communicate with a remote server, or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method of controlling rendering of a plurality of computer images, the method comprising:
   providing a plurality of first instructions to be processed at a plurality of first computers, wherein the plurality of first instructions are for rendering a first computer image of the plurality of computer images;
   providing a plurality of second instructions to be processed at a plurality of second computers, wherein the plurality of second instructions are for rendering a second computer image of the plurality of computer images;
   receiving a user request for a change; and
   in response to receiving the user request:
   regenerating the plurality of first instructions based on the user request;
   providing first delta information to be processed at the plurality of first computers, the first delta information reflecting one or more differences between the provided plurality of first instructions and the regenerated plurality of first instructions;
   regenerating the plurality of second instructions based on the user request;
   providing second delta information to be processed at the plurality of second computers, the second delta information reflecting one or more differences between the provided plurality of second instructions and the regenerated plurality of second instructions;
   receiving first rendering results from the plurality of first computers, the first rendering results corresponding to the first delta information; and
   receiving second rendering results from the plurality of second computers, the second rendering results corresponding to the second delta information.

2. The method of claim 1, wherein:
   the plurality of first computers comprise at least two remote computers;
   the plurality of second computers comprise at least two remote computers; and
   the at least two remote computers of the plurality of first computers are distinct from the at least two remote computers of the plurality of second computers.

3. The method of claim 1, further comprising:
   receiving user information indicating selection of at least one of the plurality of computer images.

4. The method of claim 3, wherein:
   the received user information indicates selection of both the first computer image and the second computer image; and
   the regeneration of the plurality of first instructions, the providing of the first delta information, the regeneration of the plurality of second instructions, and the providing of the second delta information are performed in response to the selection of both the first computer image and the second computer image.

5. The method of claim 4, further comprising:
   providing a plurality of third instructions to be processed at a plurality of third computers, wherein the plurality of third instructions are for rendering a third computer image of the plurality of computer images; and
   in response to the received user information further indicating selection of the third computer image in addition to both the first computer image and the second computer image:
   regenerating the plurality of third instructions based on the user request;
   providing third delta information to be processed at the plurality of third computers, the third delta information reflecting one or more differences between the provided plurality of third instructions and the regenerated plurality of third instructions; and
   receiving third rendering results from the plurality of third computers, the third rendering results corresponding to the third delta information.

6. The method of claim 5, wherein, in response to the received user information not further indicating selection of the third computer image, the regeneration of the plurality of third instructions and the providing of the third delta information are not performed.

7. The method of claim 1, wherein:
   the first rendering results comprise merged first rendering results; and
   the second rendering results comprise merged second rendering results.

8. The method of claim 7, further comprising controlling a display device to display the first computer image based on the merged first rendering results, and the second computer image based on the merged second rendering results.

9. The method of claim 1, wherein the first computer image and the second computer image correspond to respective variations of a scene.

10. The method of claim 1, wherein the first computer image and the second computer image correspond to respective shots of a sequence.

11. The method of claim 1, wherein the change corresponding to the received user request comprises a change to scene data affecting one or more frames.

12. A machine-readable non-transitory medium having stored thereon machine-executable instructions for controlling rendering of a plurality of computer images, the instructions comprising:
   providing a plurality of first instructions to be processed at a plurality of first computers, wherein the plurality of first instructions are for rendering a first computer image of the plurality of computer images;

providing a plurality of second instructions to be processed at a plurality of second computers, wherein the plurality of second instructions are for rendering a second computer image of the plurality of computer images;

receiving a user request for a change; and in response to receiving the user request:

regenerating the plurality of first instructions based on the user request;

providing first delta information to be processed at the plurality of first computers, the first delta information reflecting one or more differences between the provided plurality of first instructions and the regenerated plurality of first instructions;

regenerating the plurality of second instructions based on the user request;

providing second delta information to be processed at the plurality of second computers, the second delta information reflecting one or more differences between the provided plurality of second instructions and the regenerated plurality of second instructions;

receiving first rendering results from the plurality of first computers, the first rendering results corresponding to the first delta information; and receiving second rendering results from the plurality of second computers, the second rendering results corresponding to the second delta information.

13. The machine-readable non-transitory medium of claim 12, wherein:
the plurality of first computers comprise at least two remote computers;
the plurality of second computers comprise at least two remote computers; and
the at least two remote computers of the plurality of first computers are distinct from the at least two remote computers of the plurality of second computers.

14. The machine-readable non-transitory medium of claim 12, wherein the instructions further comprise:
receiving user information indicating selection of at least one of the plurality of computer images.

15. The machine-readable non-transitory medium of claim 14, wherein:
the received user information indicates selection of both the first computer image and the second computer image; and
the regeneration of the plurality of first instructions, the providing of the first delta information, the regeneration of the plurality of second instructions, and the providing of the second delta information are performed in response to the selection of both the first computer image and the second computer image.

16. The machine-readable non-transitory medium of claim 15, wherein the instructions further comprise:
providing a plurality of third instructions to be processed at a plurality of third computers, wherein the plurality of third instructions are for rendering a third computer image of the plurality of computer images; and
in response to the received user information further indicating selection of the third computer image in addition to both the first computer image and the second computer image:
regenerating the plurality of third instructions based on the user request;
providing third delta information to be processed at the plurality of third computers, the third delta information reflecting one or more differences between the provided plurality of third instructions and the regenerated plurality of third instructions; and
receiving third rendering results from the plurality of third computers, the third rendering results corresponding to the third delta information.

17. The machine-readable non-transitory medium of claim 16, wherein, in response to the received user information not further indicating selection of the third computer image, the regeneration of the plurality of third instructions and the providing of the third delta information are not performed.

18. The machine-readable non-transitory medium of claim 12, wherein:
the first rendering results comprise merged first rendering results; and
the second rendering results comprise merged second rendering results.

19. The machine-readable non-transitory medium of claim 18, wherein the instructions further comprise controlling a display device to display the first computer image based on the merged first rendering results, and the second computer image based on the merged second rendering results.

20. The machine-readable non-transitory medium of claim 12, wherein the first computer image and the second computer image correspond to respective variations of a scene, or respective shots of a sequence.

21. A system for controlling rendering of a plurality of computer images, the system comprising one or more controllers configured to:
provide a plurality of first instructions to be processed at a plurality of first computers, wherein the plurality of first instructions are for rendering a first computer image of the plurality of computer images;
provide a plurality of second instructions to be processed at a plurality of second computers, wherein the plurality of second instructions are for rendering a second computer image of the plurality of computer images;
receive a user request for a change; and
in response to receiving the user request:
regenerate the plurality of first instructions based on the user request;
provide first delta information to be processed at the plurality of first computers, the first delta information reflecting one or more differences between the provided plurality of first instructions and the regenerated plurality of first instructions;
regenerate the plurality of second instructions based on the user request;
provide second delta information to be processed at the plurality of second computers, the second delta information reflecting one or more differences between the provided plurality of second instructions and the regenerated plurality of second instructions;
receive first rendering results from the plurality of first computers, the first rendering results corresponding to the first delta information; and
receive second rendering results from the plurality of second computers, the second rendering results corresponding to the second delta information.

* * * * *